(12) United States Patent
Yip

(10) Patent No.: US 6,757,128 B2
(45) Date of Patent: Jun. 29, 2004

(54) COMPENSATION FOR MEDIA DIMENSIONAL INSTABILITY USING PRE-WRITTEN SERVOPOSITIONING TRACKS

(75) Inventor: Yung Yip, Afton, MN (US)

(73) Assignee: Imation Corp., Oakdale, MN (US)

( * ) Notice: Subject to any disclaimer, the term of this patent is extended or adjusted under 35 U.S.C. 154(b) by 29 days.

(21) Appl. No.: 10/241,196

(22) Filed: Sep. 11, 2002

(65) Prior Publication Data

US 2004/0047067 A1 Mar. 11, 2004

(51) Int. Cl.$^7$ .............................................. G11B 5/584
(52) U.S. Cl. .................................................. 360/77.12
(58) Field of Search ....................................... 360/77.12

(56) References Cited

U.S. PATENT DOCUMENTS 5,629,813 A * 5/1997 Baca et al. .............. 360/77.12
6,005,737 A * 12/1999 Connolly et al. ............. 360/75
6,222,698 B1 4/2001 Barndt et al.

* cited by examiner

Primary Examiner—David Hudspeth
Assistant Examiner—Mitchell Slavitt
(74) Attorney, Agent, or Firm—Eric D. Levinson

(57) ABSTRACT

A system and method to minimize the contribution of head channel spacing to the negative effects of transverse changes in dimensions of recording media having prerecorded servopositioning tracks. Multiple channels on the recording head are separated into multiple groups of head channels, and each group of heads is independently positioned relative to the pre-written servo tracks. The head comprises an actuator for each pair of head groups. The actuator adjusts the relative spacing between members of the pair in response to position error signals indicating misalignment between the heads and the pre-written servopositioning tracks on the medium.

10 Claims, 3 Drawing Sheets

COMPENSATION FOR MEDIA DIMENSIONAL INSTABILITY USING PRE-WRITTEN SERVOPOSITIONING TRACKS

FIELD OF THE INVENTION

This invention concerns linear recording media such as magnetic tape, and especially those media that exhibit diminished performance due to dimensional instability.

BACKGROUND OF THE INVENTION

Modern data storage systems use servopositioning (or "servo") systems to guide their recording and playback components with respect to a recording medium, and thus enable high track density, which increases data storage capacity. Errors in the ability to follow the servopositioning signals on the medium can cause unacceptable reductions in storage capacity, recording/playback rates, and other parameters that are important to consumers (and thus to system manufacturers).

Dimensional changes in magnetic recording media caused by variations in stress state or environmental conditions represent major obstacles towards recording trackwidth reduction, especially in flexible media. For example, estimates for reduction and control of media dimensional changes suggest improvement by a factor of two for future generations of magnetic media based on flexible PET or PEN substrates. Modifications to the recording system will also be required to mitigate the limitations of substrate instability. The trend towards even larger numbers of parallel channels exacerbates the effects of medium dimensional instabilities.

U.S. Pat. No. 6,222,698 (Barndt et al.) discloses an approach in which the entire multi-transducer magnetic head assembly is tilted at an azimuth angle relative to the magnetic tape to compensate for variations in tape width due to sources of dimensional instability, such as age-related tape shrinkage.

SUMMARY OF THE INVENTION

The invention provides methods and systems for reducing effects of dimensional instability of recording media having prerecorded servopositioning tracks.

One specific aspect of the invention is a method of reducing effects of dimensional instability of a recording medium, comprising separating multiple channels on a recording head into m groups of head channels, and independently positioning each group of heads relative to pre-written servo tracks on the medium.

In another aspect, the invention is a method of reducing effects of dimensional instability of a recording medium, comprising separating n channels on a recording head into m groups of channels, each group comprising at least one servo read head, and independently positioning each group of heads relative to pre-written servo tracks on the medium to minimize track misregistration caused by tape width variation. In this aspect, the track misregistration, TM, equals (n/m) times P times $\Delta$, where P is the head channel pitch, and $\Delta$ is fractional change in transverse dimension.

In another aspect, the invention is a method in which a recording head comprises groups of heads spaced apart from each other. An actuator for each pair of adjacent groups adjusts the relative spacing of at least one member of the pair with respect to the other member of the pair (i.e., one of the members could be stationary, or both members could be movable). A position error signal (PES) is measured in a conventional manner and the actuator is used to adjust the spacing of the groups to reduce the PES of each individual group. In the most preferred embodiment, there are two groups of heads, but in general there could be more. A specific implementation of this aspect includes at least the following steps: first providing the medium with at least one pair of pre-written servo tracks separated by a servo track spacing distance; providing a recording head assembly comprising at least one data head, and a pair of servo read heads spaced from each other by an amount nominally equal to the servo track spacing distance; providing the recording head assembly with an actuator to adjust the location, relative to the medium, of the pair of servo read heads; measuring, with the servo read heads from the pre-written servo tracks, a position error signal (PES) representative of the dimensional changes of the recording medium; and reducing the PES by adjusting transverse separation between any two servo read heads relative to the medium.

BRIEF DESCRIPTION OF THE DRAWINGS

The drawings are not intended to limit the scope of the invention.

DETAILED DESCRIPTION

Figure 1:
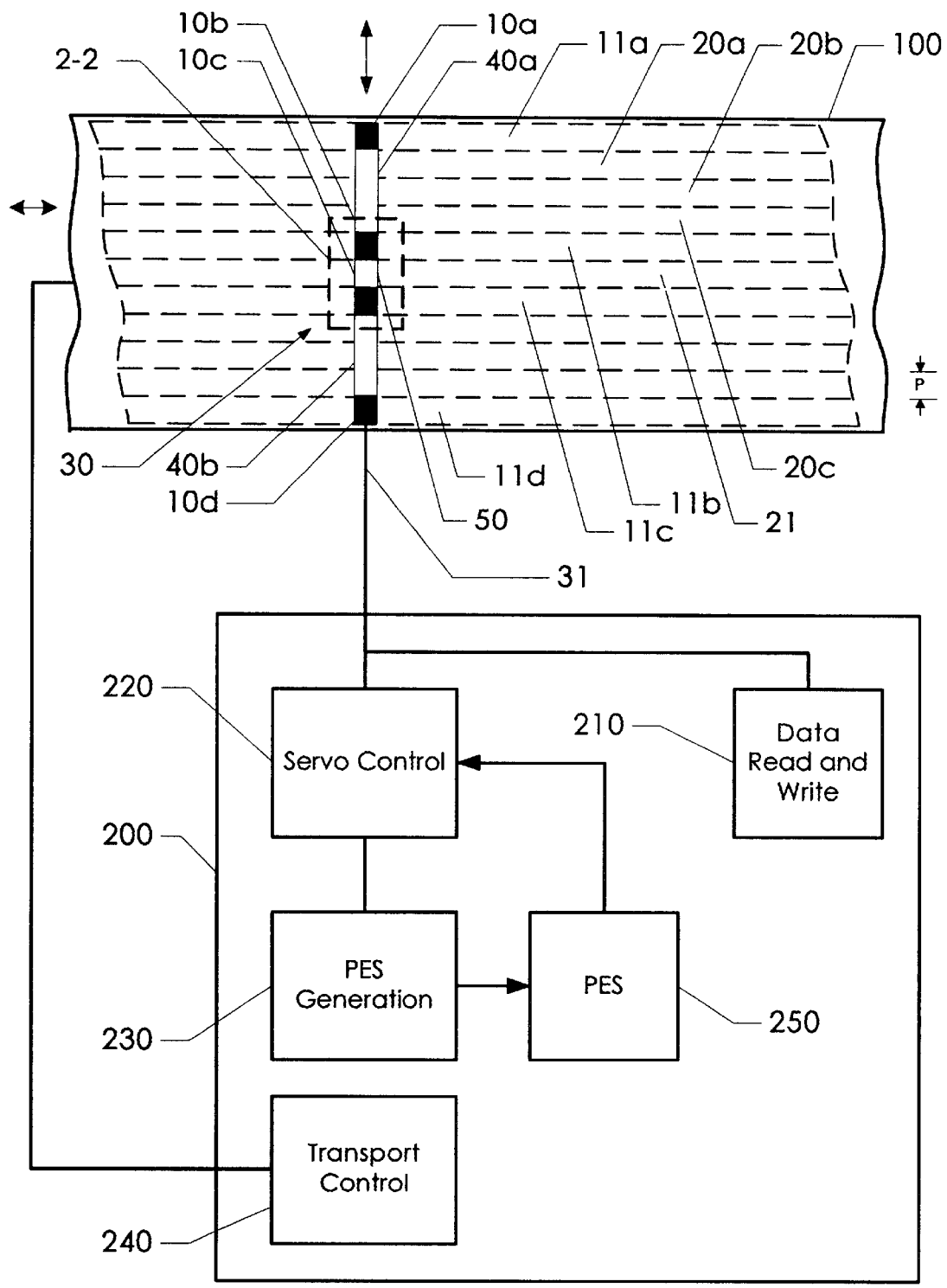
FIG. 1 is a schematic view of one embodiment of the invention.

In general terms, the invention can be embodied in an entire system of data recording and playback, including the combination of a drive and a recording medium, or as methods for accomplishing certain tasks with such a recording system. Thus, while the following description focuses on possible embodiments employing magnetic recording drives and magnetic recording media (especially tape) compatible with such drives, this is not a limitation on the scope of the invention.

To approach the problem of media dimensional changes, it must be recognized that such changes are convolved with the channel spacing of multi-channel heads to determine the effective limitations on track widths. In modem systems, multiple tracks must be recorded and read back simultaneously to achieve desirable data rates. The minimum head channel spacing is dictated by the internal structures of each record transducer. If, during a subsequent read back cycle, the span of the previously recorded track array has changed relative to the span of the head transducer array, the channels towards the outer edges of the array may either partially read an adjacent track, or (in the case of write wide/read narrow systems) the readable region would be reduced (and in the extreme case approach zero).

The amount of track mis-registration (TM) caused by media dimensional variation in the transverse ("cross-track") direction can be expressed as:

$$TM = nP\Delta$$

Where n is the number of head channels, P is the head channel pitch, and $\Delta$ is the fractional change in the transverse dimension. Table 1 (below) lists sample TM values for different combinations of numbers of head channels and head channel pitch, assuming a change in medium width (i.e., the direction transverse to the direction of recording) of 0.6 parts per thousand. The rightmost column shows TM as a percentage of a sample 6.35 μm track (4000 tracks per inch [TPI] or 4KTPI).

TABLE 1

Examples of TM as function of n and P

| n | P (μm) | Δ | TM (μm) | % of 4 KTPI Track |
|---|---|---|---|---|
| 16 | 200 | 0.0006 | 1.92 | 30 |
| 16 | 100 | 0.0006 | 0.96 | 15 |
| 16 | 50 | 0.0006 | 0.48 | 8 |
| 32 | 200 | 0.0006 | 3.84 | 60 |
| 32 | 100 | 0.0006 | 1.92 | 30 |
| 32 | 50 | 0.0006 | 0.96 | 15 |

This invention may be embodied in a system designed to minimize the contribution of the head channel spacing to the negative effects of transverse changes in medium dimension. The invention requires the presence of accurately pre-written servo tracks, however, many commercial data recording drives (such as tape drives having active servo or track positioning systems) already utilize multiple pre-written servo tracks for redundancy.

In the most general terms, the invention comprises separating the multiple recording head channels on the recording head assembly into m groups of recording head channels, and independently positioning each group of recording head channels relative to the pre-written servo tracks on the medium. Thus, TM is effectively reduced to:

$$TM = \frac{n}{m} P \Delta$$

From a practical standpoint, m is preferably not greater than 2, in which case the media dimensional instability contribution towards track mis-registration is reduced by a factor of 2 independent of the value of n.

Figure 2:
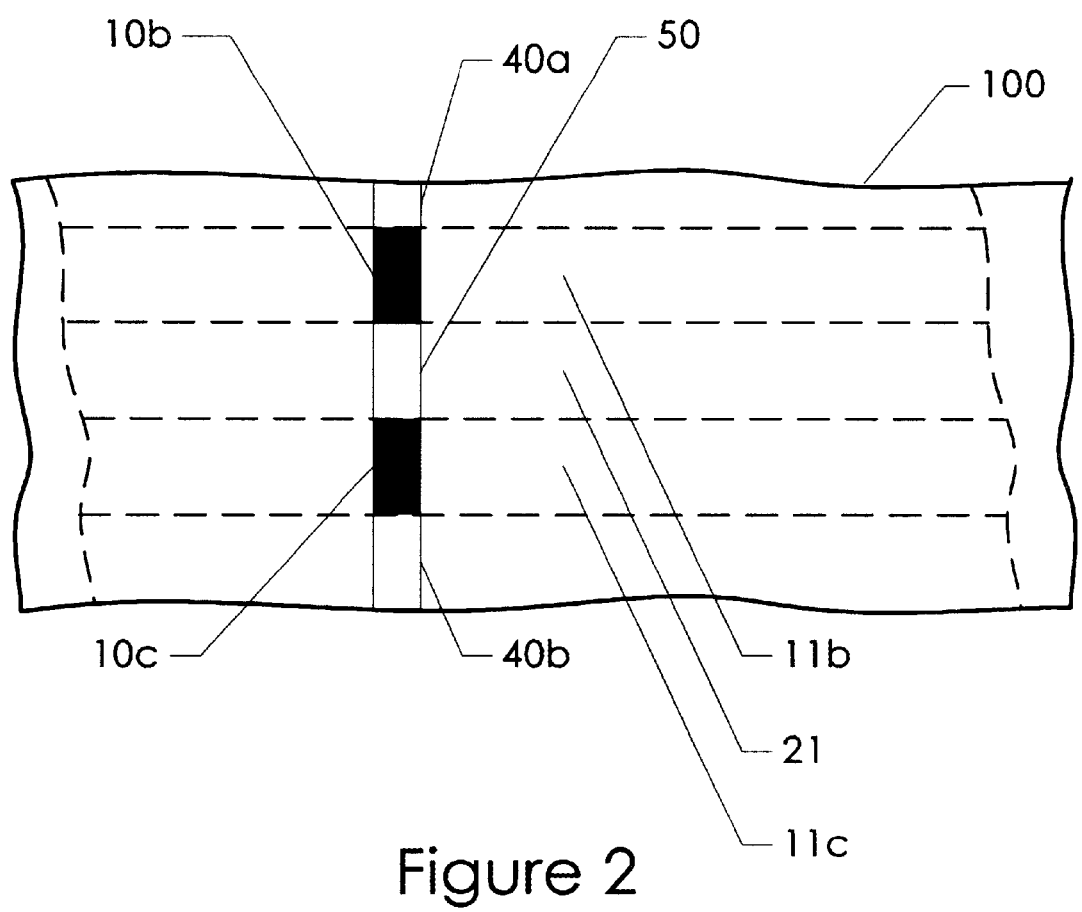
FIG. 2 is a close-up view of the portion of FIG. 1 indicated as 2-2.
Figure 3:
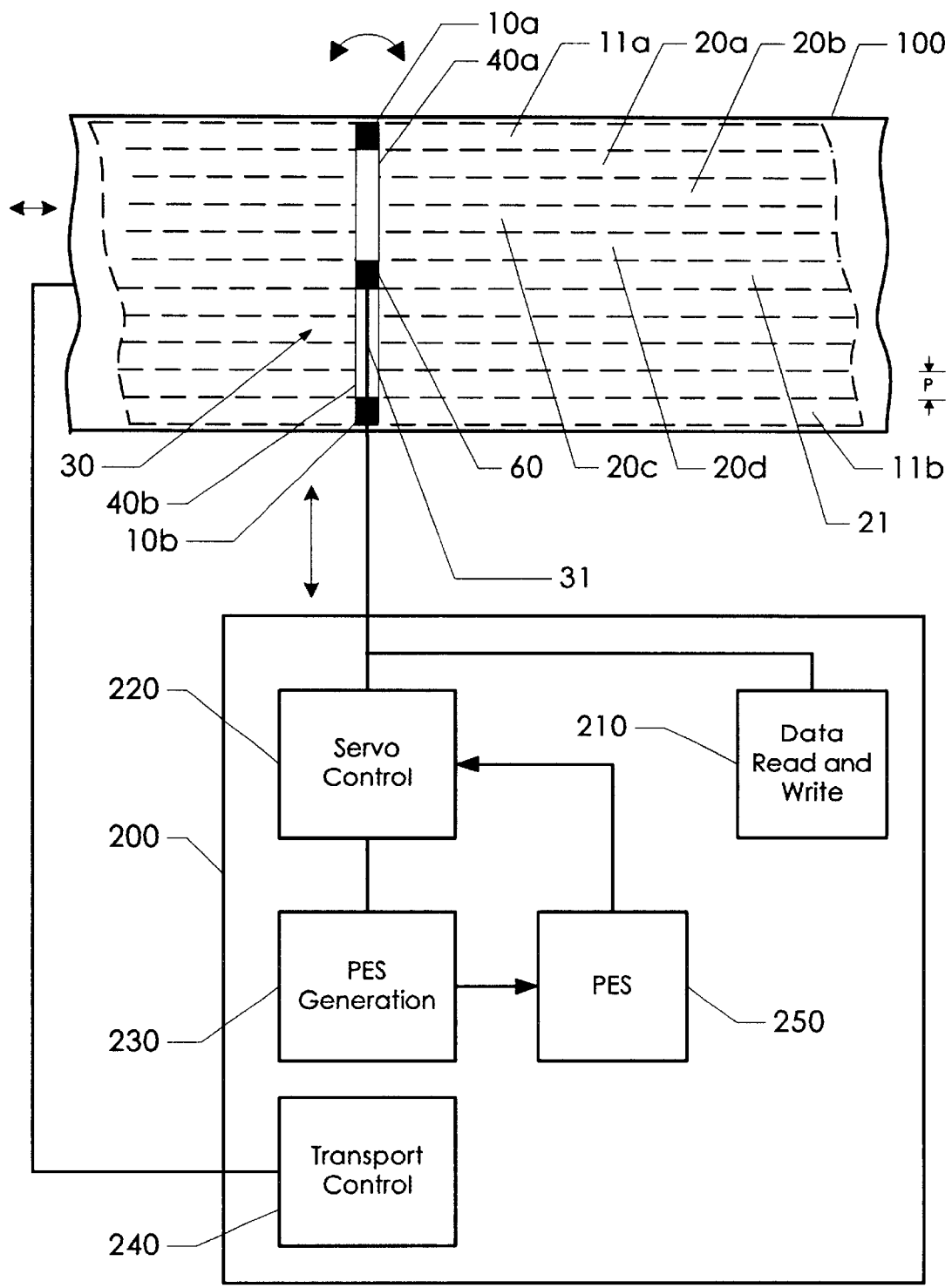
FIG. 3 is a schematic view of another embodiment of the invention.

FIGS. 1 and 2 are schematic views of one specific possible embodiment of the invention, in which the medium is tape and the data recording scheme is magnetic. FIG. 3 is a schematic view similar to FIG. 1, but of an alternative embodiment. Elements of each embodiment that correspond to each other (perhaps with slight differences as dictated by the basic difference between the two embodiments) are labeled in common.

The servo positioning system comprises a recording head assembly 30 which in turn comprises one or more read heads or transducers (or the read portions of read/write heads or transducers).

In the example shown in FIGS. 1 and 2, there are four servo read head transducers 10a-10d arranged across the width of medium 100 in the transverse direction, i.e., perpendicular to the longitudinal direction of media motion. (In the Figures, the transverse direction is taken between upper to lower, and the relative motion of the media and head is taken from side to side.) Each read head transducer 10a-10d attempts to follow its respective prerecorded servopositioning track 11a-11d, respectively. Other areas of medium 100 are available for reading and writing data, such as data tracks 20a-20c and the others shown but not labeled for clarity. In the example shown in FIG. 3, there are two servo read head transducers 10a-10b, attempting to follow their respective prerecorded servopositioning tracks 11a-11b. The data tracks are labeled 20a-20d and another four data tracks are shown but not labeled for clarity.

In both examples, the objective of the servopositioning system is to minimize the position error signal (PES) 250 generated by a PES generation circuit 230 of recording drive 200. PES is reduced by a closed loop servo control circuit 220, which controls the location or orientation (or both) of assembly 30 through head group actuator 31. Such adjustment reduces errors created by the data read/write circuit 210. Recording drive 200 also includes medium transport control 240, which typically (but not necessarily) moves medium 100 at constant velocity.

In FIGS. 1 and 2, the location of assembly 30 is adjusted transversely (ie., perpendicularly across the width of the tape, as indicated by the double headed straight arrow). In FIG. 3, the location is adjusted axially (i.e., rotation about an axis parallel to the plane of the tape, as indicated by the double headed curved arrow). It is possible to combine transverse and axial adjustments if desired, but the control system would become more complex and therefore is not preferred.

In the specific embodiment of FIGS. 1 and 2, multichannel data heads 40a and 40b have been grouped together into a pair of adjacent channel groups. As shown, each multichannel head accommodates three data channels, e.g., head 40a accommodates data channels 20a-20c, but this is only an example. As shown, assembly 30 has n=6 data channels (three for each of the two multichannel heads), split into m=2 channel groups. Each channel group contains at least one extra read head for reading the pre-written servo track on the medium (e.g., the group containing data head 40a has servo read heads 10a and 10b). The members of each pair of adjacent channel groups are functionally connected, e.g., physically attached, to a group pitch actuator 50. Group pitch actuator 50 adjusts the relative spacing of at least one member of the pair with respect to the other member of the pair (i.e., one of the members could be stationary, or both members could be movable). Since group pitch actuator 50 occupies some space, it is preferably configured so that the separate channel groups do not record on immediately adjacent data bands, and the most preferred embodiment is for an integral number of data bands to separate the head groups. For example, a single data band 21 separates the two head groups shown in FIGS. 1 and 2.

In the embodiment of FIG. 3, a group pitch actuator 50 is not employed and instead the head assembly 30 comprises a central portion 60 about which the head pivots.

In all embodiments, changes in tape width are determined from the difference in integrated PES generated by the servo channels from the separate channel groups. PES generation circuit 230 determines PES and integrates it in any convenient manner. Servo control 220 corrects for undesirable amounts of PES by changing the width of the group pitch actuator (FIGS. 1 and 2), or by adjusting the axial orientation (FIG. 3), or both (if applicable).

While only the relative separation of channel groups is required in FIGS. 1 and 2, in a preferred embodiment, one of the two groups is rigidly mounted (e.g., to the main servo actuator 31), and the other is movably mounted to the group pitch actuator 50. During normal servo tracking operation, group pitch actuator 50 is stationary and PES information for each servo head is processed in conventional "normal tracking" mode. At a frequency lower than the servo bandwidth (preferably two to three orders of magnitude lower), the PES data from the separate channel groups are sampled to determine the accuracy of each head group placement. During group pitch adjustment cycles, the main tracking servo can still operate with the PES generated by the head group that is rigidly mounted, thus eliminating the requirement for double loop control algorithms.

In either case, because changes in media dimensions have long time constants (on the order of hours), and creep induced by tape pack stress occurs over length scales of hundreds of feet, the bandwidth of the closed loop control system for group pitch actuator 50 only needs to be on the order of fractions of Hertz.

The distance that the group pitch actuator needs to traverse depends on the separation between groups. Assuming total media dimensional instability of 1 part per thousand, traverses of 3.2 μm and 6.35 μm are required to compensate for group separations of 3,175 μm (⅛") and 6,350 μm (¼"), respectively. Several electromechanical transducer options are capable of generating the required range of motion, including (without limitation) electric, piezoelectric, magnetostrictive, and thermal expansion devices.

The addition of the head group actuator requires modifications to conventional head assembly processes. Each head group can be assembled as individual sub-modules, containing the read-after-write modules. For example, the group actuator may first be attached to one of the sub-modules, and the two sub-modules then precision aligned prior to gluing. Since displacement of the sub-modules must be accurately aligned, the head group actuator displacement must be controlled during assembly (for example, either fully extended or retracted). The distance of travel required is small (e.g., <10 μm), and thus the actuator transducer can be embedded between the head groups, leaving a very small amount of unsupported tape span at the head to tape interface.

In the entire discussion above and the following claims, use of the term "adjacent" should be understood to include, but not necessarily be limited to, the specific case of "immnediately adjacent," e.g., it is possible to locate two groups of heads "adjacent" to each other even if there is a third group of heads between them. Although the two members of the pair of "adjacent" heads are not "immediately adjacent," they are nonetheless still "adjacent" each other.

In describing aspects of the invention that are methods, the description above may imply a certain sequence of events or procedures for convenience of explanation only. The scope of the invention includes other sequences of events or procedures that achieve the same result. For example, in the case of closed loop control of PES, it is possible to make adjustments based on previously performed measurements, or to take measurements and make adjustments based upon them. Therefore, it should not be assumed that a discussion of steps in the above description or the following claims is a mandatory feature of the invention, unless an order is specifically stated, or necessarily dictated by the context of the steps.

What is claimed is:

1. A method of reducing effects of dimensional instability of a recording medium, comprising separating n channels on a recording head into m groups of channels, each group comprising at least one servo read head, and independently positioning each group to minimize track inisregistration (TM) caused by tape width variation of $$TM = \frac{n}{m}P\Delta,$$

where P is head channel pitch, and Δ is fractional change in transverse dimension.

2. A method of reducing effects of dimensional instability of a recording medium exhibiting transverse dimensional changes, comprising:
   a) first providing the medium with at least one pair of pre-written servo tracks separated by a servo track spacing distance;
   b) providing a recording head assembly comprising at least one data head, and a pair of servo read heads spaced from each other by an amount nominally equal to the servo track spacing distance;
   c) providing the recording head assembly with an actuator to adjust the location, relative to the medium, of the pair of servo read heads;
   d) measuring, with the servo road heads from the pre-written servo tracks, a position error signal (PES) representative of the dimensional changes of the recording medium; and
   e) reducing the PES by adjusting transverse separation between any two servo read heads relative to the medium.

3. The method of claim 2, in which a) includes providing the medium with in pre-written servo tracks, and b) includes providing the recording head assembly with m independently adjustable groups, each group including at least one data head and at least one servo read head.

4. The method of claim 3, in which m =2.

5. The method of claim 3, in which adjacent groups are immediately adjacent.

6. The method of claim 2, in which d) further comprises:
   (1) measuring PES while the actuator is stationary; followed by
   (2) sampling PES data at a frequency lower than a servo system bandwidth.

7. The method of claim 6, in which the frequency is lower than the servo system bandwidth by approximately two to approximately three orders of magnitude.

8. The method of claim 2, in which e) comprises keeping one servo read head stationary and moving another servo read head.

9. The method of claim 2, further comprising integrating PES and detemining differences in integrated PES to adjust transverse separation of the servo read heads relative to the medium.

10. The method of claim 2, in which e) further compriscs adjusting axial position of the servo read heads in combination with the adjusting of transverse separation.

* * * * *

UNITED STATES PATENT AND TRADEMARK OFFICE
CERTIFICATE OF CORRECTION

PATENT NO. : 6,757,128 B2
DATED : June 29, 2004
INVENTOR(S) : Yung Yip

It is certified that error appears in the above-identified patent and that said Letters Patent is hereby corrected as shown below:

Column 5,
Line 56, "inisregistration" should read -- misregistration --.

Column 6,
Line 21, "road heads" should read -- read heads --.
Line 29, "medium with in" should read -- medium with m --.

Signed and Sealed this

Second Day of August, 2005

JON W. DUDAS
*Director of the United States Patent and Trademark Office*